United States Patent
Curran et al.

(10) Patent No.: US 7,281,770 B1
(45) Date of Patent: Oct. 16, 2007

(54) SYSTEM AND METHOD FOR REGENERATIVE AND ANTISKID BRAKING WITHIN AN ELECTRIC VEHICLE

(75) Inventors: Patrick Joseph Curran, Northville, MI (US); Dale Scott Crombez, Livonia, MI (US); Asi Perach, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 934 days.

(21) Appl. No.: 09/634,823

(22) Filed: Aug. 8, 2000

(51) Int. Cl.
*B60T 8/64* (2006.01)
(52) U.S. Cl. .................................................. 303/151
(58) Field of Classification Search ............... 188/15.6; 303/3, 15, 152, DIG. 9, 20, 107
See application file for complete search history.

(56) References Cited

U.S. PATENT DOCUMENTS

| | | | |
|---|---|---|---|
| 5,318,355 A | | 6/1994 | Asanuma et al. |
| 5,378,053 A | * | 1/1995 | Patient et al. ................... 303/3 |
| 5,450,324 A | | 9/1995 | Cikanek |
| 5,472,264 A | | 12/1995 | Klein et al. |
| 5,511,859 A | * | 4/1996 | Kade et al. ..................... 303/3 |
| 5,549,371 A | * | 8/1996 | Konaga et al. ............. 303/152 |
| 5,615,933 A | | 4/1997 | Kidston et al. |
| 5,664,850 A | | 9/1997 | Kuno et al. |
| 5,752,748 A | * | 5/1998 | Schramm et al. .............. 303/20 |
| 5,769,509 A | * | 6/1998 | Feigel et al. ................. 303/152 |
| 5,952,799 A | * | 9/1999 | Maisch et al. ............... 318/362 |
| 6,213,567 B1 | * | 4/2001 | Zittlau et al. .................. 303/20 |
| 6,231,134 B1 | * | 5/2001 | Fukasawa et al. .......... 303/152 |
| 6,231,135 B1 | * | 5/2001 | Bower et al. ................ 303/152 |

FOREIGN PATENT DOCUMENTS

| | | | |
|---|---|---|---|
| JP | 11-78839 | * | 3/1999 |
| WO | WO98/36956 | * | 8/1998 |

* cited by examiner

*Primary Examiner*—Bradley King
(74) *Attorney, Agent, or Firm*—Gregory P. Brown; Brooks Kushman P.C.

(57) ABSTRACT

A braking system 12 for use with an electric vehicle 10 including an electric motor/generator assembly 14, and a conventional electrical energy storage device 16. Motor/generator 14 selectively drives wheels 20 of vehicle 12. The braking system 12 includes a motor control module 26 which is communicatively coupled to motor/generator 14 and which selectively causes motor/generator 14 to provide a regenerative braking function at wheels 20 of vehicle 10. Braking system 10 further includes an antiskid braking system which selectively provides friction braking at wheels 20 and 24 of vehicle 10. The braking system 12 is effective to detect antiskid braking events at each of the wheels 20, 24, to selectively provide an antiskid braking function at each of wheels 20, 24 where the antiskid braking events are detected, and to selectively disable the regenerative braking function only when an antiskid braking event is detected at either of wheels 20.

2 Claims, 2 Drawing Sheets

SYSTEM AND METHOD FOR REGENERATIVE AND ANTISKID BRAKING WITHIN AN ELECTRIC VEHICLE

(1). FIELD OF THE INVENTION

This invention relates to a system and a method for regenerative and antiskid braking within an electric or hybrid electric vehicle and more particularly, to a system and method for regenerative and antiskid braking which provides improved performance, efficiency and reliability.

(2). BACKGROUND OF THE INVENTION

Many electric and hybrid electric vehicles employ both a conventional antiskid braking system and a regenerative braking system. The antiskid braking system typically includes several frictional drum or disc type braking assemblies which are selectively actuated by a hydraulic system. A control system modulates the hydraulic pressure applied to the frictional braking assemblies in a manner which controls the slippage of the vehicle's wheels relative to the road surface. The regenerative braking system within these vehicles utilizes the vehicle's electric motor to provide a negative torque to the driven wheels and converts the vehicle's kinetic energy to electrical energy for recharging the vehicle battery or power supply.

In one type of braking system, commonly referred to as a parallel braking system, the vehicle utilizes both traditional (i.e., friction braking) and regenerative braking during most instances. However, upon detection of an antiskid braking event, the system rapidly reduces the regenerative braking force and increases the amount of force provided by the antiskid braking system. This reduction or elimination of the regenerative braking force during antiskid events is required due to the inability and/or difficulty of the regenerative braking system to accurately provide a modulated braking force at the same frequency as the antiskid braking system, and due the tendency of the regenerative braking system to "work against" or impair the operation of the antiskid braking system during these events.

One drawback with these prior systems is that they frequently eliminate or "shut down" the regenerative braking system upon sensing any potential antiskid event.

During some antiskid events, the regenerative braking system will operate properly and will not impair the function of the antiskid braking system. Particularly, the regenerative braking system will not effect the operation of the antiskid braking system during events that are detected and/or occur only at the non-driven wheels (e.g., the wheels of the vehicle which are not driven by the electric motor). Thus, by disabling the regenerative braking function during these events, these prior systems unnecessarily lose the power-generating capabilities of the regenerative braking system during these events. Furthermore, these systems also suffer from an inconsistent braking "feel", due to the temporary power loss incurred when the regenerative torque is eliminated.

There is therefore a need for a system and a method for regenerative and antiskid braking within an electric or hybrid electric vehicle that provides improved performance, efficiency and reliability.

SUMMARY OF THE INVENTION

It is a first object of the invention to provide a system and a method for regenerative and antiskid braking within an electric or hybrid electric vehicle which overcomes at least some of the previously delineated drawbacks of prior systems and methods.

It is a second object of the invention to provide a system and a method for regenerative and antiskid braking within a vehicle which increases fuel economy and the effective range of the vehicle by minimizing the amount of time that the regenerative braking system is disabled.

It is a third object of the invention to provide a method for controlling a regenerative braking system and an antiskid braking system within an electric vehicle which provides a more consistent brake "feel".

According to a first aspect of the present invention, a braking system is provided for use within an electric vehicle having a first pair of wheels which is selectively driven by an electric machine, and a second pair of wheels. The braking system includes a first portion which selectively provides a regenerative braking function at the first pair of wheels; and a second portion which is communicatively connected to the first portion and which selectively provides an antiskid braking function at the first and second pair of wheels, the second portion being effective to detect antiskid braking events at each of the wheels, and which communicates a signal to the first portion, effective to selectively disable the regenerative braking function only if an antiskid braking event is detected at either of the first pair of wheels.

According to a second aspect of the present invention, a method is provided for braking a vehicle. The vehicle includes a first pair of wheels and a second pair of wheels, a regenerative braking system which selectively provides a braking force to the first pair of wheels, and an antiskid braking system which selectively provides a friction braking force to the first and second pair of wheels. The method includes the steps of detecting an antiskid braking event; determining whether the antiskid braking event is occurring at either of the first pair of wheels; and selectively disabling the regenerative braking system only if the antiskid braking event is occurring at either of the first pair of wheels.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
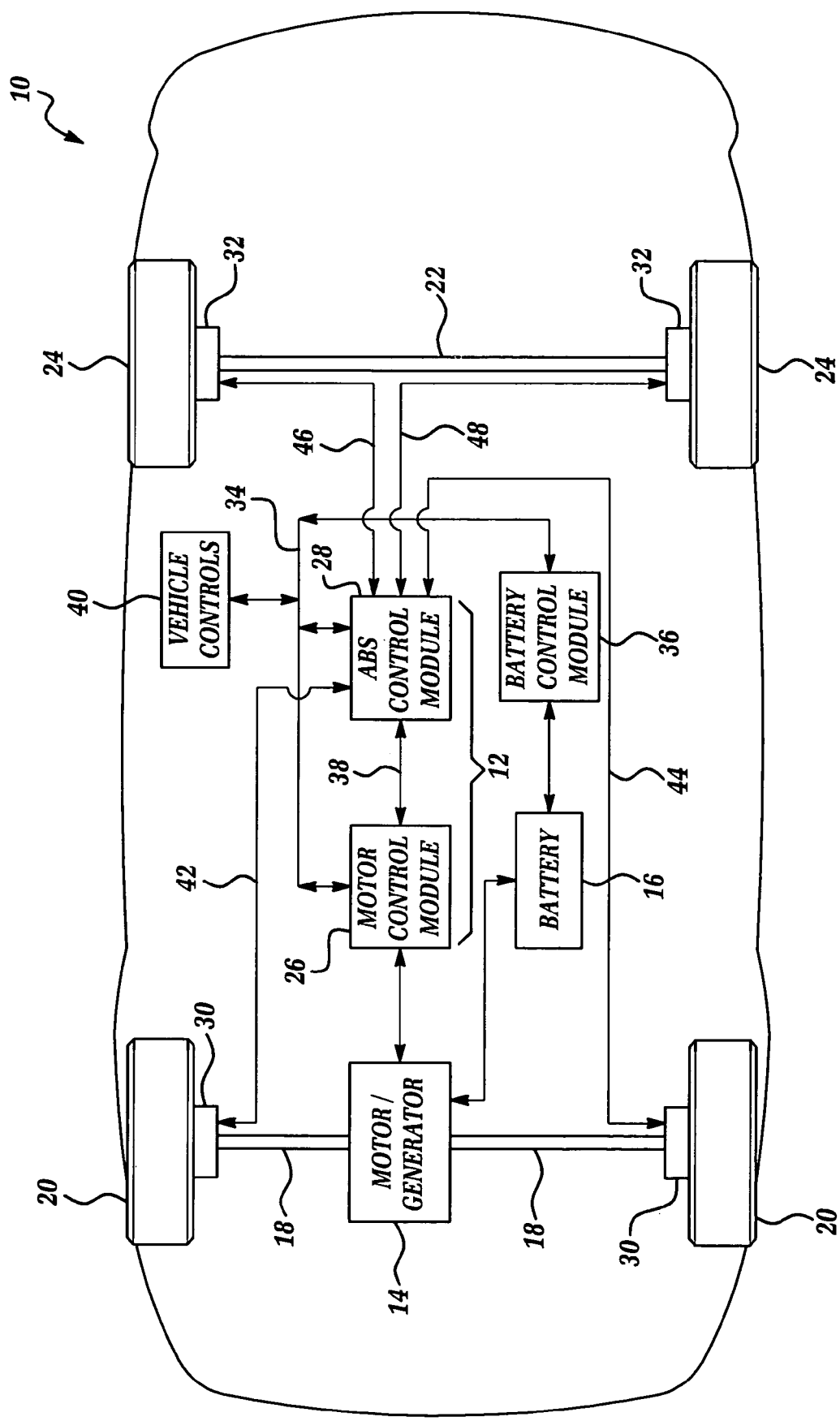
FIG. 1 is a schematic view of an electric vehicle having a braking system which is made in accordance with the teachings of a preferred embodiment of the present invention.

Referring now to FIG. 1, there is shown an automotive electric vehicle 10 having a braking system 12 which is made in accordance with the teachings of the preferred embodiment of the present invention. Vehicle 10 includes an electric motor/generator assembly 14, and a conventional electrical energy storage device 16 (e.g., a battery, fuel cell or other electrical energy storage device). Electrical storage device 16 receives power from and provides power to motor/generator 14. The electric motor/generator 14 is a conventional electric machine which selectively operates as an electric motor and a generator. Motor/generator 14 provides torque and power to the vehicle's front axle assembly 18 which transfers the torque to the front wheels 20, thereby rotatably driving front wheels 20. It should be appreciated that the terms "front" and "rear" are used herein for convenience purposes only (e.g., to respectively refer to the motor-driven wheels and the non-motor driven wheels), and in alternate embodiments of the invention, the front and rear wheels may be interchanged (e.g., motor/generator 14 may be selectively attached to rear axle assembly 22 and provide power to rear wheels 24).

Motor/generator 14 is also effective to act as a generator to provide a negative torque to the front axle assembly 18 during regenerative braking events, effective to convert the vehicle's kinetic energy to electrical energy which recharges the vehicle battery or power supply 16. In one non-limiting embodiment, motor/generator 14 comprises a first assembly which performs the motor functions of assembly 14 (i.e., a motor), and a separate second assembly which performs the generator functions of assembly 14 (i.e., a generator).

In alternate embodiments, vehicle 10 may comprise a hybrid electric vehicle that further includes an internal combustion engine. In such an embodiment, the two power sources (i.e., the internal combustion engine and generator and the electric motor) cooperatively deliver torque and power to the vehicle 10 simultaneously and independently.

Braking system 12 includes a motor control module 26, a friction and/or antiskid braking system (ABS) control module 28, and conventional braking assemblies 30, 32, which are communicatively coupled to ABS control module 28. In the preferred embodiment of the invention, motor control module 26 and ABS control module 28 are each communicatively coupled to a conventional controller area network ("CAN") bus 34. Signals transmitted over bus 34 are encoded in a conventional "CAN" format, which includes a modifier that identifies the control module or portion of the vehicle to which the signals are to be communicated. In the preferred embodiment, each control module is assigned a certain identification code, and only accepts messages including its respective assigned code.

Motor control module 26 is communicatively coupled to and controls the operation of motor/generator 14. Particularly, controller 26 receives signals and/or commands generated by vehicle controls 40 and vehicle operating condition sensors (e.g., gear selection, accelerator position, braking effort), and processes and utilizes the received signals to determine the amount of torque which is to be provided to the vehicle's front wheels 20 and to generate commands to motor 14 to selectively provide the desired torque to front axle assembly 18. Controller 26 further controls the regenerative braking function of motor/generator 14. As discussed more fully and completely below, controller 26 receives signals that provide information relating to the state of charge of battery 16, the amount of braking effort being requested and applied, and whether or not an antiskid event is occurring. Based on the received signals, controller 26 is effective to selectively enable and disable the regenerative braking function of motor 14.

In the preferred embodiment of the invention, motor control module 26 and ABS control module 28 are also communicatively connected together by an auxiliary bus 38, which communicates signals directly between the motor control module 26 and the ABS control module 28. This auxiliary bus 38 provides two significant advantages. First, the auxiliary bus 38 protects the communication between the ABS and motor control modules from a CAN bus failure or malfunction. Secondly, the signals transmitted on the auxiliary bus can be transmitted without the previously described CAN encoding, since the target recipient of the transmitted signals is always known (i.e., if the signal is transmitted from the motor control module 26, the target recipient is the ABS control module 28, and vice versa). This unencoded transmission of signals reduces the time required by modules 26 and 28 to translate or act on the received data. In one non-limiting embodiment, the CAN decoding process typically causes a delay of approximately eighteen millisecond (18 ms) from the start of an ABS cycle until the motor control module 26 can substantially reduce or eliminate the motor's regenerative torque. By use of dedicated bus 38, this delay can be desirably reduced to approximately three milliseconds (3 ms).

Braking assemblies 30, 32 include conventional friction type braking members, such as a drum or disc type members, which are actuated and/or engaged by a conventional hydraulic or electromechanical system. Braking assemblies 30, 32 further include sensors which detect wheel slipping or skidding relative to the road surface and which communicate signals in response to such a detection to ABS control module 28 over individual buses 42, 44, 46 and 48. Importantly, ABS control module 28 is able to identify the origin of the slip detection signals, and can therefore, discriminate between signals communicated from rear braking assemblies 32 (i.e., signals communicated over buses 46, 48) and signals communicated from front braking assemblies 30 (i.e., signals communicated over buses 42, 44). When a slippage has been detected at any of the wheels 20, 24 (e.g., by any of braking assemblies 30, 32), controller 28 selectively generates a conventional modulated or "ABS" type braking signal (e.g., according to a conventional stored ABS algorithm) to the respective braking members where a slippage has been detected. The modulated or ABS braking signal is effective to vary the braking force provided by the braking members, thereby substantially preventing or reducing skidding or slipping of the wheels 20, 24 relative to the road surface.

Vehicle 10 further includes a battery control module 36 which is communicatively coupled to CAN bus 34 and to battery 16. Battery control module 36 is effective to determine or estimate the state of charge of battery 16 and to generate signals representing the estimated state of charge. The generated signals are received by motor control module 26, and are used to determine whether regenerative braking can be performed (e.g., if battery 16 is fully charged, the regenerative braking function is disabled to protect battery 16).

Conventional vehicle controls 40 are also communicatively coupled to CAN bus 34. Controls 40 include, without limitation, brake pedal controls which communicate signals corresponding to the braking effort or force provided by the driver of the vehicle. Controls 40 may also include an accelerator or throttle control, gear selection controls (e.g., PRNDL), and ignition key inputs (e.g., OFF, RUN, START, ACCESSORY).

In the preferred embodiment, each control module 26, 28, 36 includes one or more microprocessors or controllers as well as other chips and integrated circuits which cooperatively control the operation of vehicle 10. Controllers 26, 28 and 36 each further include a CAN decoding portion that is effective to decode signals transmitted over bus 34.

Figure 2:
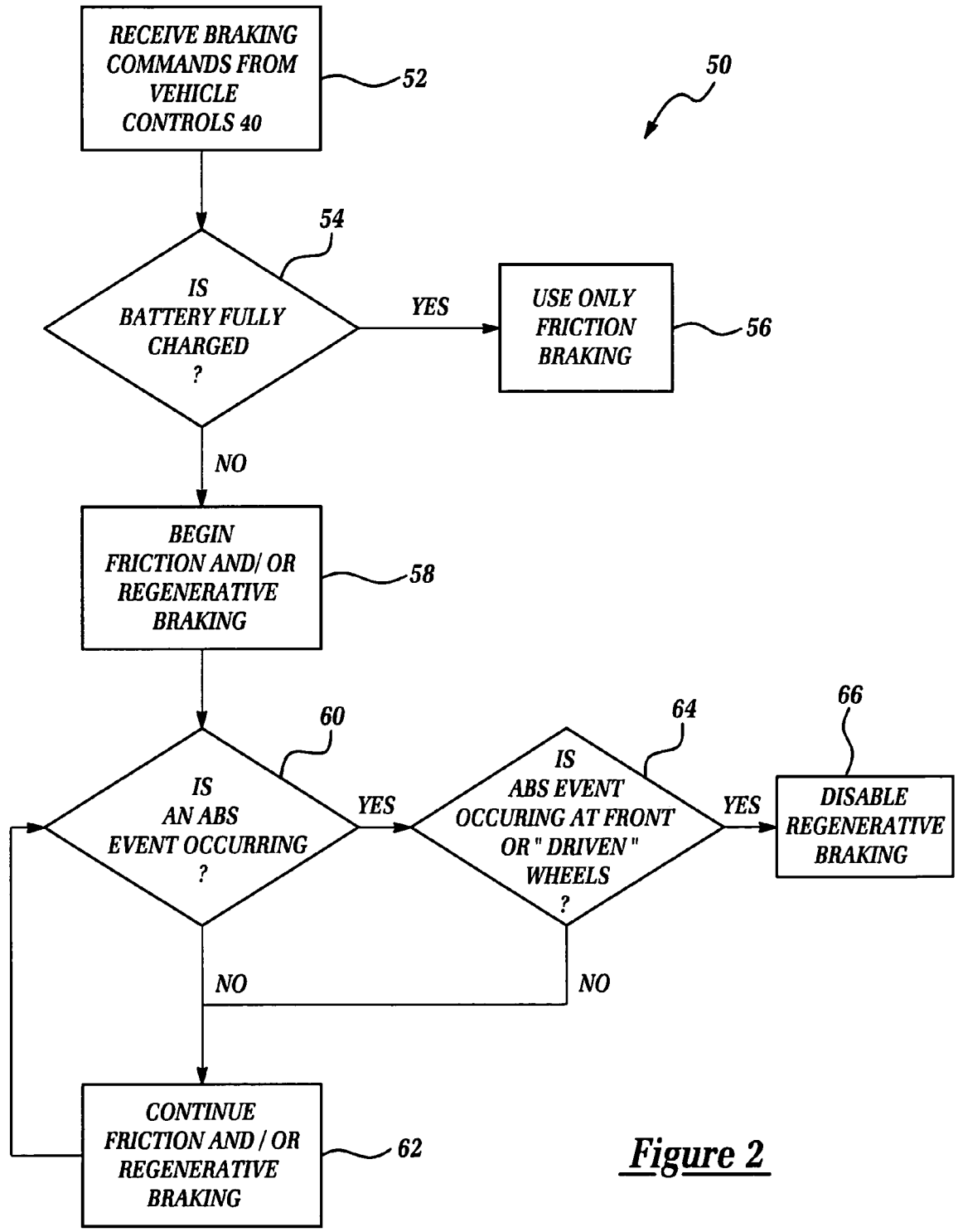
FIG. 2 is a flow chart illustrating a method used by the system shown in FIG. 1 to perform the regenerative and antiskid braking functions of the vehicle.

To best understand the operation of braking system 12, reference is now made to flow chart or diagram 50 of FIG. 2, which illustrates the strategy used by system 12 to perform the braking operations of vehicle 10. As shown, strategy 50 begins with step 52, when braking system 12 (i.e., ABS control module 28 and motor control module 26) receives braking command signals from vehicle controls 40 (e.g., from the brake pedal control). In step 54, the brake system 12 determines whether the battery is substantially fully charged. In the preferred embodiment, when the battery is fully charged, battery control module 36 communicates signals to motor control module 26 and/or ABS control module 28 over CAN bus 34 notifying the modules 26, 28 of the fully charged state of battery 16. If the battery 16 is fully charged, braking system 12 proceeds to step 56. In step 56, motor control module 26 disables the regenerative braking function of motor/generator 14, and braking system 12 utilizes only conventional friction braking, which is provided by control module 28 and braking assemblies 30, 32. Particularly, control module 28 will communicate signals to braking assemblies 30, 32, thereby engaging the respective braking members and providing the desired braking force.

If the battery 16 is not fully charged, braking system 12 proceeds to step 58 and utilizes both friction and regenerative braking (i.e., the frictional force provided by assemblies 30, 32 operates along with the negative torque provided by motor/generator 14 to slow the vehicle). In the preferred embodiment of the invention, modules 26 and 28 are programmed to provide a significant majority of the braking force through use of friction braking assemblies 30, 32. In one non-limiting embodiment, friction braking provides approximately eighty percent (80%) of the total braking force commanded and the regenerative braking performed by motor 14 provides approximately (20%) of the total braking force. It should be appreciated that by allowing the friction braking to provide a significant majority of the total braking force, the braking system 12 will have a more consistent "feel" during situations where regenerative braking is disabled relative to prior regenerative braking systems. For example and without limitation, once battery 16 becomes fully charged and the regenerative braking function is disabled, a driver will normally have to apply more force to the vehicle's brake pedal (or will have to depress the brake pedal to a greater degree) than when both regenerative and frictional braking functions are active. By reducing the contribution of the regenerative braking function to a relatively small percentage (e.g., 20%), the increased force that must be applied to the brake pedal is relatively small, and does not significantly effect the brake "feel".

In step 60, braking system 12 determines whether an ABS event is occurring. An ABS event is detected in a conventional manner by assemblies 30 and/or 32 when any of the wheels of the vehicle skids or slips relative to the road surface. Upon such a detection, the assemblies 30 and/or 32 that detect the relative slippage generate signals to ABS control module 28, thereby allowing the control module 28 to determine that an ABS event is occurring and to take appropriate action to counteract the event. If an ABS event is not occurring, braking system 12 will continue to operate, using friction and/or regenerative braking, as shown in step 62.

If an ABS event is occurring, braking system 12 proceeds to step 64, where ABS control module 28 determines whether the ABS event is occurring at the front wheels 20 (i.e., the wheels driven by motor/generator 14) based upon the identity of the bus 42-48 from which the signal was received. If the ABS event is not occurring at either of the front or "driven" wheels 20 (i.e., the event is occurring only at the rear or "non-driven" wheels 24), braking system 12 proceeds to step 62 and continues to use both friction and regenerative braking. ABS control module 28 modulates the signal to the braking assemblies 32 where a slippage has been detected in a conventional manner, effective to substantially prevent wheels 24 from slipping relative to the road surface. Otherwise, if the ABS event is occurring at the front or "driven" wheels 20, braking system 12 proceeds to step 66 and disables the regenerative braking function performed by motor/generator 14, thereby preventing the negative torque produced during regenerative braking from interfering with the ABS function of assemblies 30. ABS control module 28 then generates an ABS braking signal to all of the braking assemblies 30, 32 where a slippage is detected, thereby substantially preventing any of the wheels 20, 24 from slipping or skidding relative to the road surface. In the preferred embodiment of the invention, ABS control module 28 communicates a signal to motor control module 26 over both CAN bus 34 and auxiliary bus 38, effective to substantially reduce and/or eliminate the regenerative braking force provided by motor generator 14. The use of both buses 34, 38 protects against a bus malfunction or failure.

It should be appreciated that the use of regenerative braking when an ABS event is sensed at the rear wheels 22 does not adversely effect or interfere with ABS function performed by module 28 and braking assemblies 32, since the negative torque produced during regenerative braking is applied only to the front wheels 20 of the vehicle by motor/generator 14. Moreover, by disabling regenerative braking only when the ABS event is sensed at the front or "driven" wheels, the present invention increases the amount of regenerative energy provided to power supply 16, thereby enhancing the fuel economy and effective range of electric vehicle 10. It should further be appreciated that the above-delineated braking strategy can be used in both series and parallel type braking systems.

It should be appreciated that in alternate embodiments, the above-described functional steps may be performed in a different order or procedure, and may include other additional procedures which are used in conjunction with the functional steps described herein. It is understood that the invention is not limited by the exact construction or method illustrated and described above, but that various changes and/or modifications may be made without departing from the spirit and/or the scope of the inventions.

What is claimed is:

1. A method for braking within a vehicle having a first pair of wheels and a second pair of wheels, a regenerative braking system which selectively provides a braking force to said first pair of wheels and an antiskid braking system which selectively provides a friction braking force to said first and second pair of wheels, said method comprising the steps of:

providing an auxiliary bus;

selectively and directly coupling said regenerative braking system and said antiskid braking system together by use of said auxiliary bus and an encoded CAN bus, wherein said auxiliary bus is only communicatively disposed between said regenerative braking system and said antiskid braking system and is effective to communicate only unencoded signals between said regenerative braking system and said antiskid braking system;

detecting an antiskid braking event;

determining whether said antiskid braking event is occurring at either of said first pair of wheels; and transmitting an unencoded signal through said auxiliary bus and said encoded CAN bus to selectively disable said regenerative braking system if said antiskid braking event is occurring only at either of said first pair of wheels such that transmitting said signal through both said encoded CAN bus and said auxiliary bus provides reliability to ensure disablement of said regenerative braking function if one of said encoded CAN bus and said auxiliary bus fails.

2. The method of claim 1 wherein said vehicle comprises a battery, said method further comprising the steps of:

determining a state of charge of said battery; and selectively disabling said regenerative braking system if said state of charge of said battery is substantially full.

\* \* \* \* \*